(12) United States Patent
Gallucci et al.

(10) Patent No.: US 8,807,841 B2
(45) Date of Patent: Aug. 19, 2014

(54) BEARING ASSEMBLY

(75) Inventors: Francesco Gallucci, Volvera (IT);
Roberto Mola, Turin (IT)

(73) Assignee: Aktiebolaget SKF, Gothenburg (SE)

( * ) Notice: Subject to any disclaimer, the term of this patent is extended or adjusted under 35 U.S.C. 154(b) by 362 days.

(21) Appl. No.: 13/141,970

(22) PCT Filed: Dec. 23, 2008

(86) PCT No.: PCT/EP2008/068239
§ 371 (c)(1),
(2), (4) Date: Jun. 23, 2011

(87) PCT Pub. No.: WO2010/072266
PCT Pub. Date: Jul. 1, 2010

(65) Prior Publication Data
US 2011/0255814 A1    Oct. 20, 2011

(51) Int. Cl.
*F16C 33/32* (2006.01)

(52) U.S. Cl.
USPC ................................................ 384/492

(58) Field of Classification Search
USPC ......... 384/445, 477, 484, 489, 490, 592, 513, 384/535–537, 548, 564, 581–583; 277/353, 277/549, 551, 572, 573, 576, 577, 925
See application file for complete search history.

(56) References Cited

U.S. PATENT DOCUMENTS

| | | | | |
|---|---|---|---|---|
| 3,594,050 A | * | 7/1971 | Gothberg | 384/484 |
| 3,658,395 A | * | 4/1972 | Hallerback | 384/484 |
| 3,770,992 A | * | 11/1973 | Veglia | 384/489 |
| 3,876,266 A | | 4/1975 | Rozentals | |
| 4,362,344 A | | 12/1982 | Lederman | |
| 4,632,576 A | * | 12/1986 | Neal | 384/537 |
| 4,872,770 A | * | 10/1989 | Dickinson | 384/484 |
| 7,637,665 B2 | * | 12/2009 | Cook | 384/477 |
| 2003/0012475 A1 | * | 1/2003 | Vignotto et al. | 384/544 |

FOREIGN PATENT DOCUMENTS

| | | |
|---|---|---|
| DE | 1575374 A1 | 12/1969 |
| DE | 102006034729 B3 | 1/2008 |
| FR | 2828534 A1 | 2/2003 |

* cited by examiner

*Primary Examiner* — James Pilkington
(74) *Attorney, Agent, or Firm* — Bryan Peckjian; SKF USA Inc. Patent Department

(57) ABSTRACT

A bearing assembly (10) provided with a rolling bearing unit (20) having an outer ring (21) provided with a centring flange (21*f*) with a peripheral edge (27) and an inner ring (22) provided with a relevant centring flange (22*f*) with a relevant peripheral edge (28) with a contact configuration for rolling elements, a plastic modular body (50) which snapped fixed on the bearing unit (20) and is radially limited by a radially outer, axial cylindrical surface (11) integral with the outer ring (21) and a radially inner, axial cylindrical surface (12) integral with the inner ring (22); coupling device (80) being provided to join mechanically the plastic body (50) to the bearing unit (20) so as peripheral edges (27, 28) partly define the relevant cylindrical surfaces (11, 12), and the plastic modular body (50) being provided, for each ring (21) (22), with two annular bodies (62, 64) (71, 73) which are mounted on either side of said central flange (21*f*, 22*f*).

12 Claims, 5 Drawing Sheets

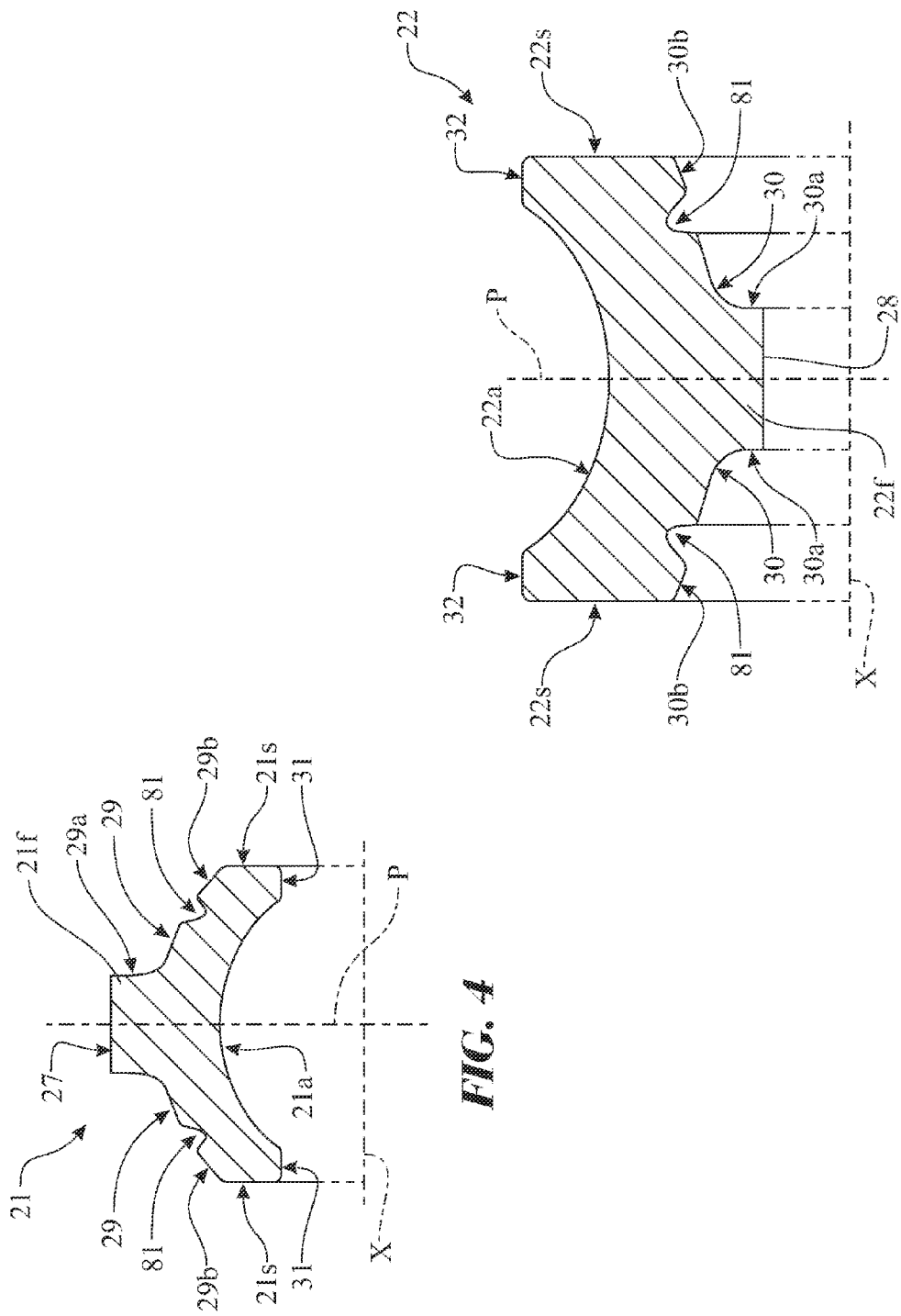

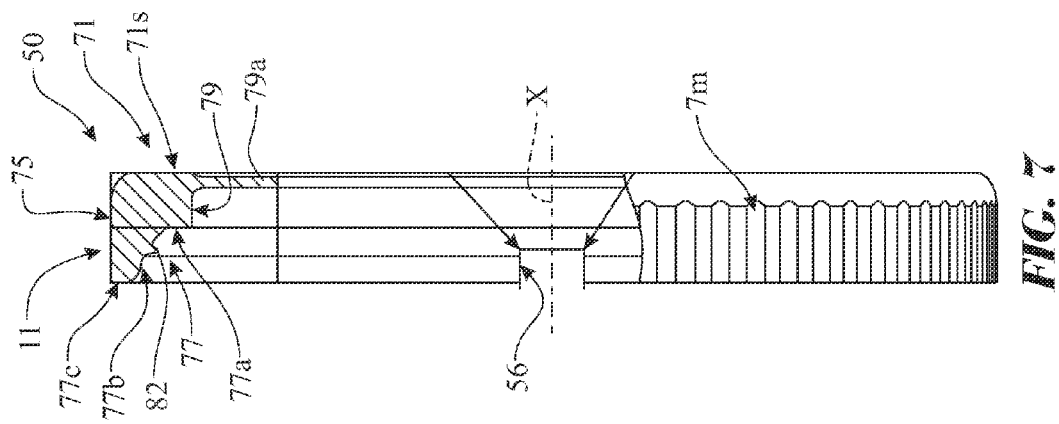
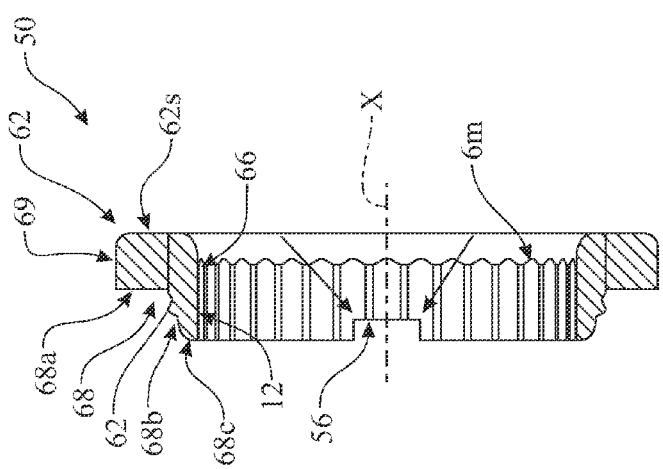

BEARING ASSEMBLY

CROSS REFERENCE TO RELATED APPLICATIONS

This application claims priority to the following patent application: (1) Patent Cooperation Treaty Application PCT/EP2008/068239 filed 23 Dec. 2008; the above cited application is hereby incorporated by reference herein as if fully set forth in its entirety.

BACKGROUND OF THE INVENTION

The present invention relates generally to a bearing assembly.

More particularly, the present invention relates to a bearing assembly having inner and outer rings and ring parts provided with annular bodies of plastics material.

Bearing assemblies having annular elements of plastic material overmolded on the inner and outer rings are known and used in several industrial and automotive applications, e.g. for rotatably supporting a shaft in an electric motor while preventing the bearing from potentially damaging electric currents passing through it. Bearing assemblies of the above kind are also used for applications where it is desired to reduce the amount of steel constituting the bearing, so as to gain a weight reduction and also reduce the number of costly treatments of the bearing steel.

SUMMARY OF THE INVENTION

An object of the present invention is to provide a lightweight, cost effective bearing assembly capable of ensuring high accuracy having regard to coaxiality or concentricity of the bearing ringways with respect to the central geometric axis of the axle or shaft mounted centrally in the bearing. Another object of the invention is to provide a bearing assembly which may be flexibly used in a wide range of applications, according to the axial bulk required or allowed for a specific appliance. A further object of the invention is to provide a bearing assembly which can be easily and quickly assembled and, in some case, also disassembled.

Toward the attainment of these and additional objects and advantages, the present invention provides a bearing assembly as defined in the independent claims. Preferred embodiments of the invention are set out in the dependent claims.

BRIEF DESCRIPTION OF THE SEVERAL VIEWS OF THE DRAWINGS

In order that the present invention may be well understood there will now be described some embodiments thereof, given by way of example, reference being made to the accompanying drawings, in which:

FIGS. 4 and 5 are enlarged views of details of FIGS. 2 and 3, respectively;

FIGS. 6 and 7 are axial cross-sectional views of other two components of the bearing assembly of FIG. 1.

DETAILED DESCRIPTION OF THE INVENTION

Figure 1:
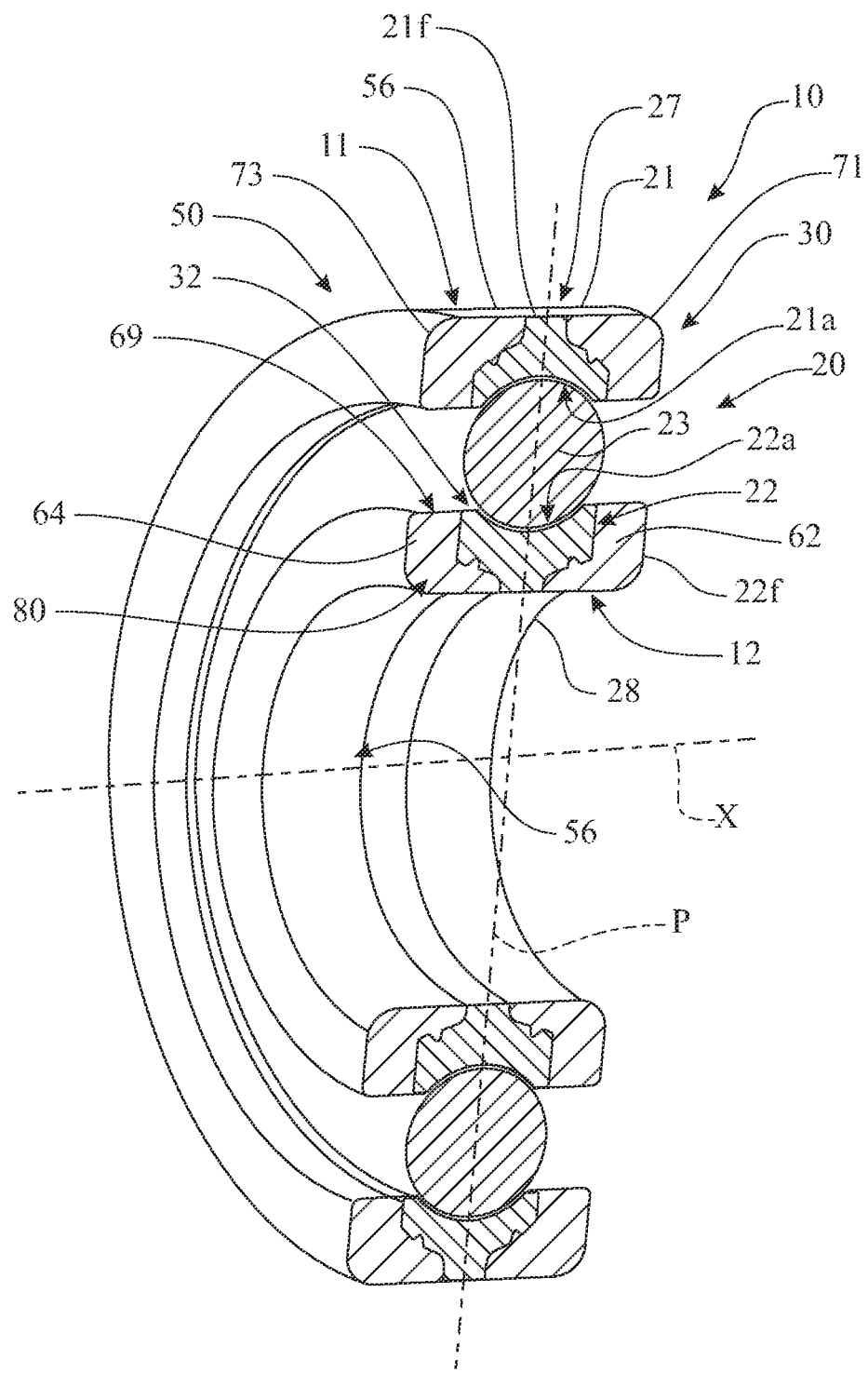
FIG. 1 is a perspective view of a partially sectioned bearing assembly in accordance with a first embodiment of the invention.
Figure 3:
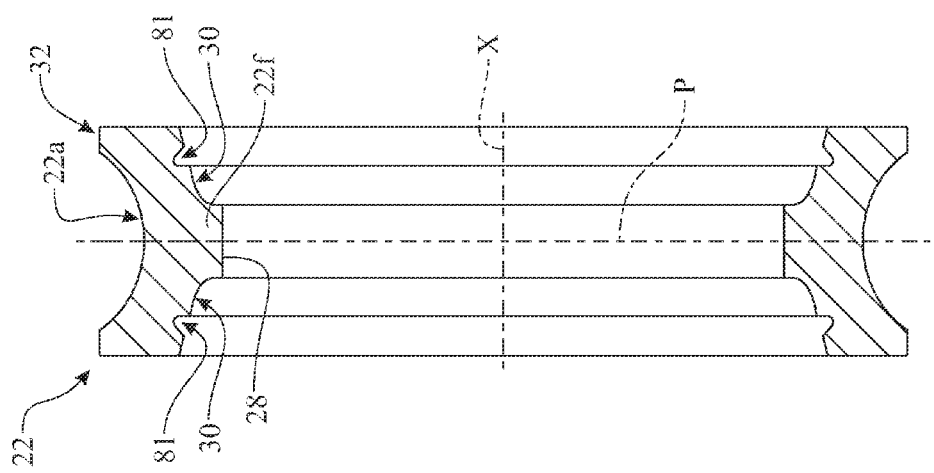
FIGS. 2 and 3 are axial cross-sectional views of two elements of the bearing assembly of FIG. 1.
Figure 2:
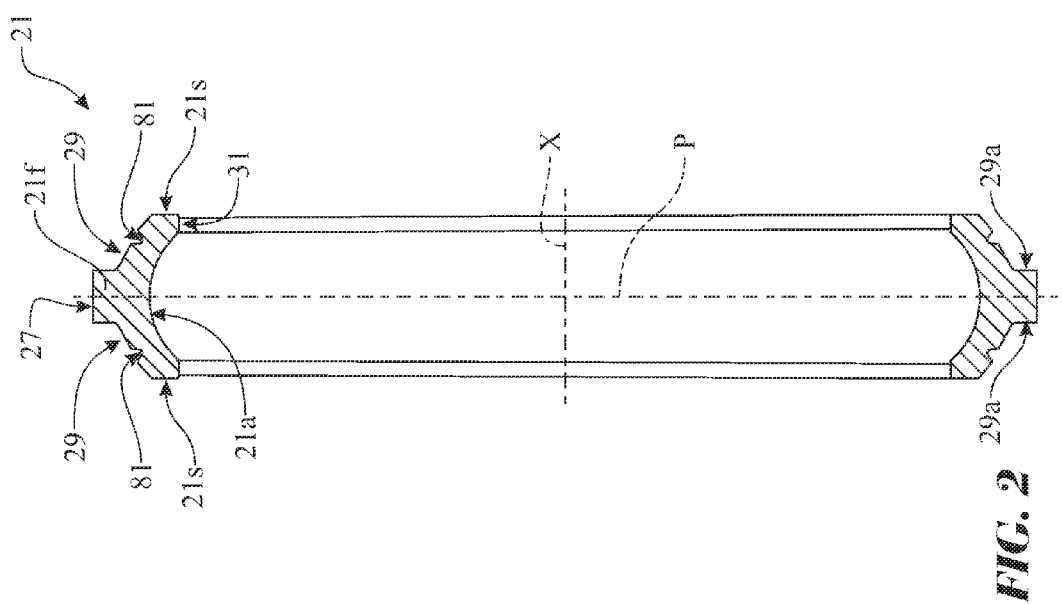

Referring to FIG. 1, a preferred embodiment of a bearing assembly according to the invention is generally designated 10.

The unit is radially delimited by a radially outer, axial cylindrical surface 11 and by a radially inner, axial cylindrical surface 12, and comprises:
 a bearing unit 20,
 a plastic modular body 50 which is radially delimited by the surfaces 11 and 12 and which is coupled with the bearing unit 20; and
 coupling device 80 which mechanically join the plastic body 50 to the bearing unit 20.

As used herein, terms and expressions indicating positions and orientations such as "inner", "outer", "radial", "axial" will be construed with respect to the central axis of rotation x of the bearing unit 20. Further, the word "centring" is referred to bringing or keeping the components of the bearing assembly 10 concentric or coaxial to the central axis x.

The bearing unit 20 comprises a radially outer ring 21, a radially inner ring 22 and a set of rolling elements 23 (in this example balls) interposed between rings 21 and 22.

Each ring 21, 22 is provided with a respective raceway 21a, 22a for the rolling elements 23 and is also provided with a respective radially flange 21f, 22f which extends in a direction radially opposite to the relevant raceway 21a, 22a. More specifically, the flange 21f is a radially outwardly extending central flange 21f with an outer peripheral edge 27 ending flush with the outer cylindrical surface 11 of the bearing unit (FIG. 1). Similarly, the flange 22f is a radially inwardly extending central flange with an inner peripheral edge 28 ending flush with the inner cylindrical surface 12 of the bearing unit.

The function of the flanges 21f and 22f is to provide a continuous path made entirely in steel or ferrous metal and extending radially from a central shaft (not shown) fitted in the inner ring 22, to an outer housing (not shown) in which the outer ring 21 is fitted. The components of such a path are the outer and inner bearing rings 21 and 22 with the rolling elements 23 and the relevant raceways 21a and 22a. All these parts strong, accurately sized steel or ferrous members, which will guarantee perfect concentricity of the raceways 21a and 22a with respect to the central axis X of the above-mentioned axle or shaft and of the above-mentioned outer housing. In order to ensure uniform distribution of strain and stress, the flanges 21f and 22f both extend in a same radial plane P of axial symmetry for the bearing assembly 10 and for the raceways 21a and 22a.

As better shown in FIG. 4, the outer ring 21 is provided with a couple of flat side surfaces 21s which are perpendicular to the axis X, and it is further provided with a couple of lateral shaped faces 29, which extend from the relevant surfaces 21s to the relevant peripheral edge 27. Furthermore, the two lateral shaped faces 29 are symmetrical placed with respect to the plane P and in turn comprise a flat portion 29a which is parallel to the plane P and 29a axially bounds the flange 21f, and a bend portion 29b which has got a curvature substantially similar to the curvature of the relevant raceway 21a and is substantially sloping towards the axis X starting from the plane X.

The outer ring 21 is provided also with a couple of flat cylindrical surfaces 31 which are coaxial to the axis X, and are perpendicular to the relevant surfaces 21s in order to join the surfaces 21s to the relevant raceway 21a.

As better shown in FIG. 5, the inner ring 22 is provided with a couple of flat side surfaces 22s which are perpendicular to the axis X and are coplanar to the relevant side surfaces 21s, and it is further provided with a couple of lateral shaped faces 30, which extend from the relevant surfaces 22s to the relevant peripheral edge 28. Furthermore, the two lateral shaped faces 30 are symmetrical placed with respect to the plane P and in turn comprise a flat portion 30a which is parallel to the plane P and axially bounds the flange 28, and a substantially conical portion 30b which is tapered away from the plane P.

The inner ring 22 is provided also with a couple of flat cylindrical surfaces 33 which are coaxial to the axis X, and are perpendicular to the relevant surfaces 22s in order to join the surfaces 22s to the relevant raceway 22a.

As shown in FIG. 1, the plastic modular body 50 is provided with:
- two annular bodies 62 and 64 which are coupled to the inner ring 22 and are both delimited by the surface 12, and
- two annular bodies 71 and 73 which are coupled to the outer ring 21 and are both delimited by the surface 11.

The annular bodies 62 and 64, so as the annular bodies 71 and 73, are identical to each other and are placed in their assembled position in a symmetrical position with respect to the plane P. Due to this identity, and with reference to FIGS. 6 and 7, only the body 62 and 71 are now depicted, but all the reference to these two bodies 62 and 71 can be transferred to the other two bodies 64 and 73.

As shown in FIG. 6, the body 62 has a flat, radial side surface 62s facing away from the bearing unit 20 and a cylindrical surface 66 lying flush with the edge 28 of the relevant central flange 22f. In other words, the inner edge 28 is flush with the radially inner, cylindrical surfaces 66 of the two annular plastic bodies 62, 64 mounted to the inner ring 22.

The annular body 62 has got a cylindrical outer surface 69 lying flush with the surfaces 32 of the relevant ring 22 and has got a shaped face 68 which faces towards the bearing unit 20 and is shaped in a complementary way with respect to the shape of the relevant face 30. More particularly, the face 68 comprises a flat portion 68a which is parallel to the plane P and axially abuts the surface 21s, and a substantially conical portion 68b which is tapered towards the plane P and is placed against the conical portion 30b.

The annular body 62 comprises also a shaped edge 68c which is delimited by the conical portion 68b and by the cylindrical surface 66 and axially abuts the flat surface 30a.

As shown in FIG. 7, the annular body 71 has a flat, radial side surface 71s facing away from the bearing unit 20 and coplanar to the side surface 62s of the relevant body 62, and a cylindrical surface 75 lying flush with the edge 27 of the relevant central flange 21f. In other words, the outer edge 27 is flush with the radially outer, cylindrical surfaces 75 of the two annular plastic bodies 71, 73 mounted to the outer ring 21.

The annular body 71 has got a cylindrical inner surface 79 lying flush with the surfaces 31 of the relevant ring 21 and has got a shaped face 77 which faces towards the bearing unit 20 and is shaped in a complementary way with respect to the shape of the relevant face 29. More particularly, the face 77 comprises a flat portion 77a which is parallel to the plane P and axially abuts the surface 21s, and a substantially bend portion 77b which is substantially sloping towards the axis X away from the plane X and is placed against the bend portion 29b.

The annular body 71 comprises also a shaped edge 77c which is delimited by the conical portion 77b and by the cylindrical surface 75 and axially abuts the flat surface 29a.

In the embodiment of FIG. 7, the annular body 71 is also provided with a flange 79a which radially projects towards the axis X as of the surface 79 and ends in front of the outer surface 69 of the annular body 62 in order to seal an annular gaps between the inner ring 22 and the outer ring 21 by defining a labyrinth seal of the bearing unit 20. The flange 79a is preferably but not necessary made of plastic and can lay on a plane parallel to the plane P. Furthermore, the flange 79a can be injection-moulded with a metal powder filler and can be magnetized in order to define an encoder for monitoring the speed of the bearing unit 20 which can be provided with an external sensor (not shown) both for being coupled to the encoder and for monitoring either the temperature or other functional parameters of the bearing unit 20. Similarly, also the annular body 62 might be provided with a relevant flange (not shown) which radially protrudes away from the axis X as of the surface 69 and ends in front of the inner surface 79 of the annular body 71 in order to increase the sealing features of the said labyrinth seal for the bearing unit 20.

Following implementing requirements, the labyrinth seal may be realized either on both sides or on only one side of the bearing unit 20, that is only one of the bodies 62, 64 and/or only one of the bodies 71, 73 might be provided with the relevant flange which protrudes towards the other bodies 71, 73 and 62, 64.

The external surfaces 62s, 66, 71s and 75 of the annular bodies 62 and 71, that is also of the annular bodies 64 and 73, define the external dimensions and shape of the bearing unit which can be either symmetrical (as shown) or asymmetrical with respect to the plane P. The plastic material of the plastic modular body 50 allows to change on demand the external shape of the bearing unit in a simple and economic way and, first of all, without changing the characteristics of the bearing unit 20, that is without changing the mechanical features of the bearing unit as well.

The flat surfaces 68a and 62s, such as the flat surfaces 77a and 71s, fix the axial dimensions of the bearing unit once the axial dimension of the bearing unit 20 has been in turn fixed. Furthermore, the flat surfaces 68a, such as the flat surfaces 77a, define another continuous path extending axially from the plane P to the outer surfaces 62s, 71s in order to assure an accurate axial positioning of the bearing unit.

The conical portions 30b and 68b, such as the bend portions 29b and 77, allow to define the assembled mutual position of the bodies 62, 64 and 71, 73 to the rings 21 and 22 and give to the formers the elasticity in order to facilitate fitting and eventually removing these bodies 62, 64 and 71, 73 onto and from the bearing rings 21 and 22.

The coupling device 80 join mechanically, either permanently or semi-permanently, the annular bodies 62, 64 and 71, 73 to the inner ring 22 and the outer ring 21 and are suitable to allow the modular body 50 to be quickly mounted on the bearing unit 20.

In the example of FIGS. 1 to 7, the coupling device 80 comprise radially extending circular grooves 81 and correspondingly shaped reliefs or crests 82.

Two grooves 81 are formed in each ring 21 and 22, one on either side with respect to the central flanges 21f and 22f along the relevant portions 29b and 30b. The relief 82 of each annular body 62, 64 and 71, 73 are defined by relevant continuous bulges which protrude towards the axis X from the relevant faces 68 and 77 and are snapped into the corresponding groove 81 of the relevant bearing ring 21 and 22. The annular bodies 62, 64 and 71, 73 are coupled, in pairs and side-to-side in an axial direction, to the inner ring 22 and outer ring 21 by said coupling device 80.

Those skilled in the art will readily recognize that, as an alternative, a reverse or equivalent arrangement could be designed with respect to that shown in FIGS. 1 to 7. For example, the grooves 81 could be obtained in the annular bodies 62, 64 and 71, 73, whereas the mating circular reliefs 82 would be formed in the rings 21 and 22.

As shown in FIGS. 1 to 7, the grooves 81 are formed on the conical portion 30b and on the bend portion 29b of the shaped faces 30 and 29 of the rings 21 and 22, and the reliefs 82 are formed on the relevant conical portion 68b and on the bend portion 77b of the shaped faces 68 and 77 of the annular bodies 62, 64 and 71, 73.

The bodies 62, 64 and 71, 73 are further provided with one or more recesses 56, which are made along the relevant edge 68c and 77c and are axially protruded inside relevant edge 68c and 77c in order for the tip of a sharp tool to be introduced between the bodies 62, 64 and 71, 73 and the flanges 21f and 22f and disengage the coupling device 80 so as to remove the annular bodies 62, 64 and 71, 73 from the bearing rings 21 and 22.

In the embodiment as shown in FIGS. 6 and 7, the bodies 62 and 71 are further provided with a number of axial knurlings 6n and 7n which are made on the relevant surfaces 69 and 75 in order to increase the friction with a central shaft (not shown) fitted in the inner ring 22 and with an outer housing (not shown) in which the outer ring 21 is fitted.

As will be appreciated, the bearing unit is made lighter as a whole by the modular body 50 of plastic material. At the same time, the centring flanges 21f and 22f of the bearing rings 21 and 22 will allow precise metal-to-metal coupling with a central shaft and an outer housing, thereby ensuring perfect concentricity of the bearing raceways 21a and 22a with respect to the central axis X. Another advantage is that the drive fit of the bearing unit on a metal shaft and in a metal housing takes place between metal and metal, and is therefore reliable with time and not affected by temperature variations which could, on the other hand, reduce stability of the coupling of two materials having different coefficients of expansion, such as steel and plastic materials. The process of putting together the bearing unit will be quick. Optionally, in some applications an adhesive or centering means can be applied to the annular bodies 62, 64 and 71, 73 or the bearing rings 21 and 22 prior to snap-mounting these components together.

Furthermore, it would be useful to point out that, optionally, also only one bearing ring 21, 22 may be provided with the centring flange 21f, 22f and, in this case, the other ring 22, 21 will be a one-piece bearing ring radially delimited by an axial cylindrical surface that entirely defines the relevant cylindrical surface 11, 12 of the bearing assembly 10. In this case, which is not illustrated but it may easily be understood from the description, the plastic modular body 50 comprises only two annular bodies which are mounted on either side of the only one central flange 21f, 22f. The single centring flange 21f, 22f with axial cylindrical surface of the one-piece bearing ring will allow precise metal-to-metal coupling with a central shaft and/or an outer housing as well. The bearing ring 21, 22 without centering flange 21f, 22f will be chosen depending on the specific application.

Depending on the specific application, the plastics material which the annular bodies 62, 64 and 71, 73 are made from e.g. a thermo hardened plastic or a polymer (e.g. PEEK), injection-moulded without or with a metal powder filler, for example a light metal such as aluminium or alloys thereof. The filler may be chosen so as to compensate for thermal expansion to which some of the bearing parts may be subjected in use. Other filler materials, such as steel powder or glass fibre are also contemplated.

In the embodiment of FIGS. 1 to 5, the edges 27, 28 of flanges 21f, 22f constitute circumferentially continuous portions of the cylindrical surfaces 11, 12 of the entire bearing unit, and for other purposes, the edges 27, 28 of flanges 21f, 22f might constitute circumferentially discrete portions of the cylindrical surfaces 11, 12.

Figure 8:
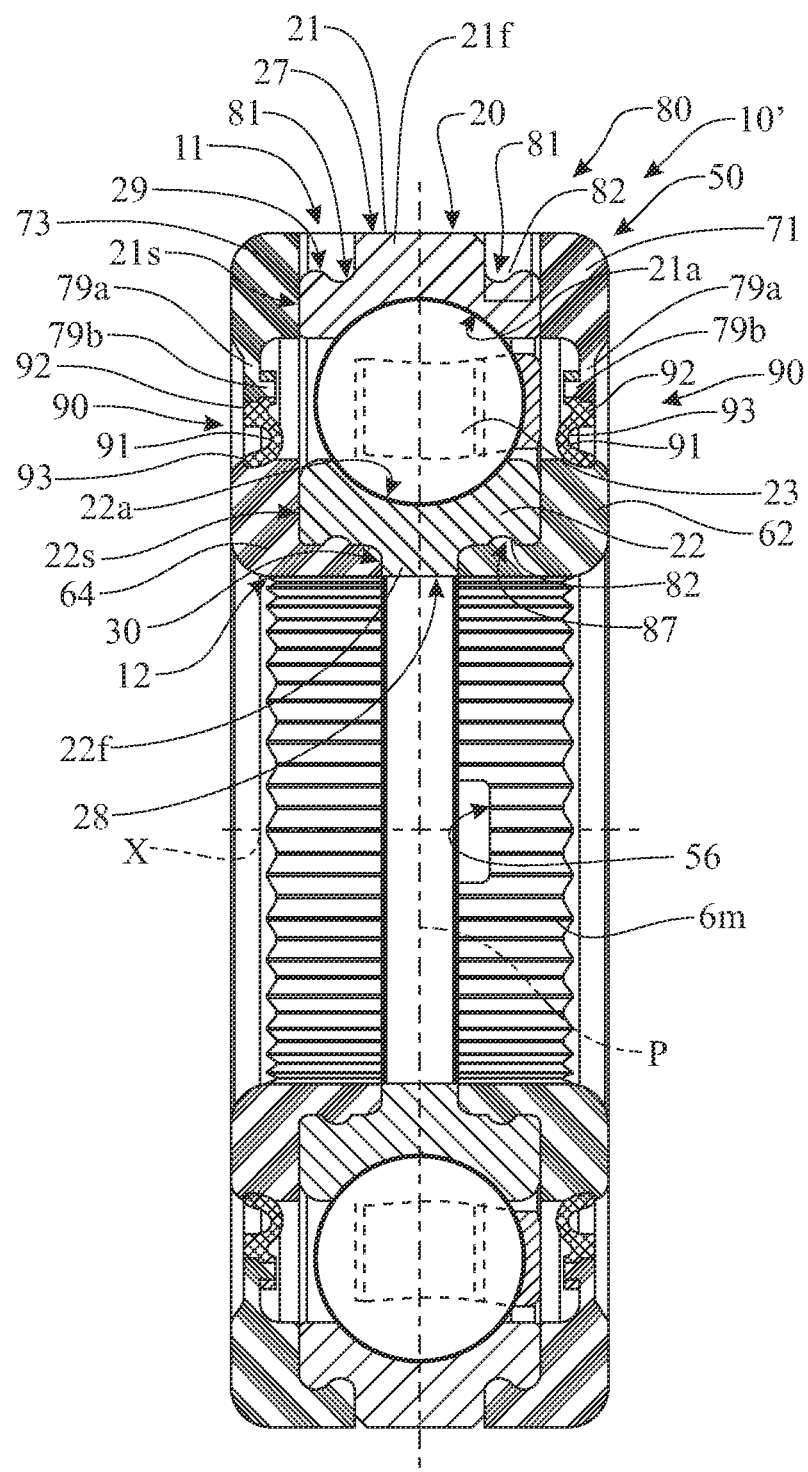
FIG. 8 is an axial cross-sectional views of a sectioned bearing assembly in accordance with a second embodiment of the invention.

The form of embodiment which is illustrated in FIG. 8 relates to a bearing assembly 10' which is similar to the bearing assembly 10, from which the bearing assembly 10' differs due to the fact that the portions 29a are not bend but they are substantially cylindrical and, the portions 30b are not conical but they are substantially cylindrical too.

Furthermore, the bearing assembly 10' differs from the bearing assembly 10 due to the fact that it comprises a sealing device 90, which seals the annular gaps between the inner ring 22 and the outer ring 21, and in turn it comprises, for each side of the bearing assembly 10', a sealing lip 91 which projects from the relevant flange 79a towards the relevant surface 69 and it is placed in sliding contact with the relevant surface 69 to exert radial sealing pressure on the relevant surface 69.

Each sealing lip 91 is preferably but not necessarily made of rubber and it is vulcanized with the relevant flange 79a. More particularly, each sealing lip 91 is provided:
  with an annular root 92 which is directly linked to a teeth 79b of the flange 79a, and
  with a free portion 93 which projects from the relevant root 92 and which defines a flinger to throw away dust and other impurities.

While specific embodiments of the invention have been disclosed, it is to be understood that such disclosure has been merely for the purpose of illustration and that the invention is not to be limited in any manner thereby. Various modifications as to the rolling element contact configuration, the shape e.g. additional functions like extension with a flange for fixation purposes, fixation grooves in the outer ring, location of parts, and other constructional and functional details will be apparent to those skilled in the art in view of the foregoing. For example, the outer or the inner rings may indifferently be rotatable or stationary, according to the application requirements. Also, the axial thickness of the annular bodies to be mounted to a given bearing unit may be chosen as a function of the available space

The invention claimed is:

1. A bearing assembly comprising:
  a roller bearing unit including an inner ring and an outer ring each having a raceway for rolling elements and being rotatable relative to each other around a rotation axis, the outer ring having an outer peripheral edge;
  a modular body formed of a plastic material and fixed to the roller bearing unit, the modular body having a cylindrical surface that is flush with the outer peripheral edge of the outer ring of the roller bearing unit; and
  coupling means for mechanically joining the plastic body to the roller bearing unit;
  wherein the outer ring has a central, radially extending, outer ring flange delimiting part of the outer peripheral edge of the outer ring, the inner ring has a central, radially extending, inner ring flange that forms part of an inner peripheral edge of the inner ring; and
  wherein the modular body includes four annular bodies, two of the four annular bodies being mounted on either side of the central, radially extending, outer ring, flange of the outer ring and radially limited by the outer peripheral edge of the outer ring of the roller bearing unit, and the other two of the four annular bodies being mounted on either side of the central, radially extending, inner ring flange of the inner ring and radially limited by the inner peripheral edge of the inner ring of the roller bearing unit.

2. The bearing assembly according to claim 1, wherein the coupling means are a snap-on coupling means for at least semipermanently joining the plastic body to the roller bearing unit.

3. The bearing assembly according to claim 1 wherein the central, radially extending, outer ring flange and the central, radially extending, inner ring flange both extend in a same radial plane of axial symmetry of the roller bearing unit.

4. The bearing assembly according to claim 1 wherein the four annular bodies each have a flat, radial side surface facing away from the roller bearing unit and a cylindrical annular body surface generally flush with the peripheral edge of the associated central, radially extending flange.

5. The bearing assembly according to claim 1, wherein the four annular bodies are arranged in axial side-to-side pairs and are coupled to the inner and outer rings by the coupling means.

6. The bearing assembly according to claim 1, wherein the coupling means include radially extending circular grooves formed in one of the rings and the annular bodies and complementary shaped crests formed on the other one of the rings and the annular bodies.

7. The bearing assembly according to claim 1, wherein the coupling means include two grooves formed in each bearing ring, one on either side of the central, radially extending flange of each bearing ring.

8. The bearing assembly according to claim 1, wherein the coupling means are formed on complementary shaped surfaces of the rings and of the annular bodies.

9. The bearing assembly according to claim 1, wherein each annular body has a side generally facing the central, radially extending flange of the corresponding inner and outer bearing ring and at least one recess formed in the side so as to facilitate removal of the annular bodies from the corresponding ring.

10. The bearing assembly according to claim 1, wherein at least one of the four annular bodies includes a flange which projects toward another, radially opposing one of the four annular bodies in order to seal an annular gap between the inner ring and the outer ring at one side of the roller bearing unit.

11. The bearing assembly according to claim 1, wherein at least one of the four annular bodies includes a flange projecting toward another, radially opposing one of the four annular bodies and the bearing assembly further comprises a seal configured to seal an annular gap between the inner ring and the outer ring, the seal including a sealing lip which projects from the flange of the one annular body towards a sliding surface of the radially opposing annular body so as to exert radial sealing pressure on the sliding surface, the sealing lip being vulcanized with the flange.

12. The bearing assembly according to claim 1, wherein the modular body is formed of a polymer combined with a metal particle filler.

\* \* \* \* \*